United States Patent Office

3,597,189
Patented Aug. 3, 1971

---

3,597,189
PROCESS FOR THE BENEFICIATION OF TITANIFEROUS ORES
Hari Narayan Sinha, Surrey Hills, Victoria, and David McBride Waugh, Gladstone, Queensland, Australia, assignors to Commonwealth Scientific and Industrial Research Organization and Murphyores Incorporated Pty. Ltd., Brisbane, Queensland, Australia
Filed Apr. 22, 1968, Ser. No. 723,008
Claims priority, application Australia, May 1, 1967, 21,087/67
Int. Cl. C22b 1/00
U.S. Cl. 75—1                                 19 Claims

---

ABSTRACT OF THE DISCLOSURE

Process for the beneficiation of titaniferous ores wherein the natural ore is oxidized to convert substantially all of the iron values present to the ferric state and the oxidized ore is then deoxidized to convert substantially all of the iron values therein to the ferrous state and the product in which substantially all of the iron values therein are in the ferrous state containing not more than 20% of the metallic iron.

---

This invention relates to the benefication of titaniferous ores and is particularly concerned with the production of an "up-grade" rich in titanium dioxide ($TiO_2$) and suitable for use as a feed material in the production of high purity titanium oxide and titanium metal.

At the present time, rutile is in great demand for the production of $TiO_2$ as it is substantially free from iron and can therefore be readily processed. However, the immense and ever expanding developments in use of high purity titanium oxide by the pigment and paper industry, combined with the increasing demand for titanium metal, appears to be outstripping the available sources of rutile. Due to this and because of the large and readily extractable deposits of other titaniferous ores throughout the world, the development of economic processes for beneficiating such ores to a point where the $TiO_2$ content becomes comparable with that of rutile is of considerable importance. However, the other titaniferous ores—such as ilmenite—vary considerably in composition so that, as stated by one authority in the field, "the proliferation (of beneficiation methods) has probably comes about since work in most places has been directed at a particular source and type of ilmenite that is easily obtained in that place."

The currently favoured method of producing $TiO_2$ from rutile is on in which the rutile is first chlorinated to give titanium chloride ($TiCl_4$) which is converted to $TiO_2$ by burning, the chlorine thus generated being recycled. It is therefore a pre-requisite of the chlorination process that as pure grade of $TiO_2$ as possible is used in order to reduce chlorine consumption to a minimum. On the other hand, the traditional process for producing $TiO_2$ is based on reacting a high grade ilmenite, or slags rich in $TiO_2$, with sulphuric acid. Here again, there are economic and technological advantages (for example, decreased acid consumption, increased tank capacity and output, decreased need of scrap iron, contraction of waste disposal problems etc.) in using an acid soluble form of $TiO_2$ rather than ilmenite.

It is important therefore that upgrades of titaniferous ores should not only contain very high proportions of $TiO_2$ but should provide no difficulty when used as feed material for either of these processes. For example, upgrades intended for the sulphuric acid process for the manufacturing of pigment grade $TiO_2$ must be soluble in sulphuric acid. On the other hand, the chlorination process developed for rutile invariably involves the use of fluid bed reactors and, for this reason, one of the main pre-requisites of an acceptable upgrade substitute for rutile is that the particle size range of the upgrade product should be substantially the same as rutile. Consequently, beneficiation methods based upon slagging, fusion, etc. are of limited interest. Current beneficiation methods are therefore based either upon the direct leaching of iron from ilmenite, or the leaching of metallic or carbide iron by a variety of aqueous systems after a substantially complete reduction of the iron values in the ore to metallic or carbide iron.

The many known direct acid leaching processes suffer from the poor reactivity of natural titaniferous ores such as ilmenites and therefore involve the use of high acid concentrations and temperatures such that leaching operations have to be carried out under pressure. The reactivity of these ores is so poor that even under such conditions the times required for adequate leaching are protracted. For example, in one of the more recent acid leaching processes (U.S. Pat. No. 3,193,376) a two stage leaching cycle has been adopted using pressures of between 30 and 35 p.s.i.g. at each stage and even so, leaching times of 4 to 6 hours per stage are needed. Furthermore, in each stage relatively concentrated hydrochloric acid (CHl; 20° Bè., 32%) has to be injected. Temperature and acidity parameters are stated to be critical if the production of "fines" is to be kept to a minimum. Although the process is claimed to be capable of producing material containing about 93% w./w. $TiO_2$ these figures appear to be very specific to the particular type of ore employed. Moreover, with some ores significant amounts of titanium values are precipitated in a finely divided form whilst leaching. Finally, the efficient recovery of 20° Bè. HCl from chloride containing effluents by existing commercial processes is considerably more difficult and expensive than the recovery of HCl of significantly lower concentrations.

In another direct acid leaching process (U.S. Pat. No. 2,127,247) an attempt has been made to overcome the similarity in reactivity to acid leachants of ferric oxide ($Fe_2O_3$) and $TiO_2$ in natural partly altered ilmenite by preliminary chemical reduction of ferric values to the ferrous state. Reduction temperatures are limited to a maximum of 800° C. since high temperatures, it is stated, cause a substantial decrease in the solubility of the residues in 80% sulphuric acid. Additionally, it is stated that the leaching stage subsequent to the reduction stage, must be carried out at temperatures above the boiling point of the leachant and above atmospheric pressure in order to obtain a high degree of enrichment of $TiO_2$ by avoiding substantial solution of titanium values.

In the second group of prior art processes involving the leaching of metallic or carbide iron, the aim is to achieve as high a degree of reduction in the iron values as possible, since this is usually the factor determining the quality of the final material. When hydrogen is the reductant, complete chemical reduction of the iron values to metallic iron is a fairly slow process even when preceded by an oxidation stage; and, perhaps of more importance, thermodynamic considerations—even for equilibrium conditions at 900° C.—limit the utilization of hydrogen to about 5%. For this reason, the hydrogen injected must be free from significant amounts of contaminants and dehydration and re-pressurizing stages must be incorporated before the unused hydrogen is recirculated to the reactor. Reduction by carbon is also a slow process even operating in the temperature range 1100 to 1200° C. and calls for close control of the atmosphere above the reacting mass if the particle size and the physical nature of the product is not to be radically altered by sintering and the like processes. The unreacted carbon is later recovered, in a separate operational stage by suitable physical methods, for re-use albeit in a less chemically active form than formerly.

Leaching of such reduced material usually involves contacting the reduced material with aqueous solutions containing various additives, sometimes in the presence of oxygen when a form of accelerated rusting occurs. See for example U.S. Pat. No. 3,252,787, Australian Pat. No. 247,110, and German Pat. No. 1,218,734. Such processes are claimed to produce a beneficiated product containing up to 90% w./w. $TiO_2$. Here again, it is likely that the practicability of this type of process is very dependent upon the detailed composition of the particular titaniferous ore body employed.

The general object of the present invention is therefore to provide an improved process for the beneficiation of titaniferous ores which will, preferably, avoid the disadvantages associated with each of the above mentioned classes of prior art process and, yet, will not add significant disadvantages of its own. Thus, it would be advantageous if the treatment processes were less severe and the treatment times shorter. Similarly, it would be desirable for the improved process to be less selective in respect of ore types and yet to be capable of producing upgrades having $TiO_2$ contents above the levels currently obtained by the prior art processes.

The present invention is able to substantially achieve these objects and advantages as it is based upon the surprising discovery that, if the natural ore is oxidized to convert the iron values present to the ferric state and then deoxidized again, the material obtained in this way is so chemically active that is readily and directly leachable.

Preferably, deoxidation should not be carried to the stage where metallic iron is formed in any substantial amount.

Before discussing the implications of this discovery and its application in the present invention, it should be understood that, in the present specification, the preferred titaniferous ore is natural ilmenite but ores having $TiO_2$:Fe ratios outside the normally accepted range for ilmenite are also included within the ambit of this term. Usually titaniferous ores of the ilmenite variety have an average $TiO_2$ content of between 50 and 55% but there are massive deposits in which the proportion of $TiO_2$ is as low as 20% as mined and, possibly, 45% after ore dressing. Furthermore, since for the purposes of the present invention the chemical properties or activity of the materials produced by the above mentioned successive process of oxidation and deoxidation are so significantly different from those of the natural ore, this material will be referred to as "synthetic ore" to distinguish it from the natural ilmenite.

The conversion of the iron values in the natural titaniferous ore to the ferrite state may be achieved by a simple process of oxidation which, preferably, is conducted at a temperature below that at which sintering of particles occurs. Because the naturally occurring ores differ considerably in the ratio of their ferric and ferrous values, the time required for oxidation is dependent upon that ratio but this process parameter can be readily adjusted to suit the particular ore. The preferred method of oxidation is by the action of gaseous oxygen suitably diluted with other relatively inert gases; atmospheric air therefore being especially preferred for this purpose. The use of pure oxygen is possible but less desirable due to the difficulty of controlling temperature uniformly and the consequent danger of sintering. Similarly, it is possible but not preferred to employ oxygen containing compounds such as carbon dioxide, water or mixtures thereof, which are capable of oxidizing iron to the ferric state under the process conditions.

The deoxidation step may be carried out using any material suitable for the conversion of ferric iron to ferrous. Solid reagents such as carbon may be used but gaseous reagents are preferred; these include carbon monoxide, hydrocarbon gases, hydrogen, and mixtures of these in or with other gases such as water gas, producer gas and hydrogen-rich gas mixtures from catalytic reforming processes. Conversion of the oxidized product to the synthetic ore is extremely rapid and efficient when carried out by hydrogen at 850 to 900° C. Hydrogen utilization usually exceeds 75% under these conditions thereby obviating the need to recycle unused hydrogen. For this reason, dehydration and re-pressurizing facilities are not required; neither is it necessary to use pure hydrogen—we have obtained satisfactory results when using impure hydrogen, such as that obtained by reforming organic materials such as naphtha.

The use of excessive amounts of hydrogen may lead to the formation of metallic iron in the titaniferous material. This imposes no considerable disadvantage beyond the economic penalty, arising from the fact that the hydrogen utilization falls to about 5% after formation of the synthetic ilmenite has occurred, and the possible hazards if hydrogen is evolved during subsequent leaching operations. We have detected beneficial effect of the synthetic ilmenite when excess hydrogen has been used to the point where the reduced titaniferous material contains about 20% w./w. of metallic iron, i.e. to the point where the X-ray powder diffraction pattern of ilmenite becomes difficult to detect.

Having formed the synthetic core, the preferred but not necessarily exclusive method of benefication is by acid leaching. The preferred acid is hydrochloric acid since this can be readily generated from hydrolysable or reducable chlorides by well known commercial and readily available techniques which present the possibility of producing iron oxide powder or metallic iron powder as saleable by-products along side the recovered hydrochloric acid. Furthermore, since sensibly all the iron values in the synthetic ore are in the ferrous state, the amount of leachant required is a minimum and significantly less than in those processes which leach natural ores in which a substantial part of the iron values are in the ferric state.

Because of the enhanced activity of the synthetic ore compared with that of the natural ore, we have found it practicable to use a 20% solution of hydrochloric acid as leachant instead of the more concentrated acid used in existing processes dealing with natural ores. The ability to use such a dilute HCl solution (slightly less concentrated than the constant boiling mixture at one atmosphere pressure) considerably simplifies the leaching operation, which, preferably takes place at between 105 and 110° C. Thus, we have found that a single treatment of synthetic ore, or sufficiently low siliceous and aluminous gangue content with 20% hydrochloric acid, in quantity corresponding to about 20% excess over the stoichiometric amount required for dissolution of the undesired acid soluble non-titaniferous values in the ore, carried out for about four hours at 108 to 110° C. at atmospheric pressure under reflux conditions, produces a pale-yellow residue which contains 95 to 97% w./w. $TiO_2$ and is of substantially the same particle size range as the natural ore. (A quantity of soluble titanium species corresponding to about 1% w./w. of the initial $TiO_2$ passes out in the ferrous chloride effluent.

Such a product is soluble in the sulphuric acid solutions commonly used in the art and this, together with the non-degradation of particle size, makes the product a suitable feed material for both sulphuric acid and chlorination processes, providing that the nature and extent of the residual and concomitant impurities are acceptable. Moreover, the only adaption of the process to suit a particular ore required is in the aforementioned requirement for complete oxidation of the iron values in the natural ore to the ferric state since, provided that is done, the leachability of the synthetic ore produced seems to be essentially constant regardless of the natural ore employed. Although it is not claimed that the process of the invention will remove all contaminants from any natural ore, it has been found that the process described above effects a considerable decrease in the extent of manganese and magnesium contamination and, to a lesser degree, in the chromium and aluminum contamination. Finally, it will be noted that the upgrade made by the process of this invention is not only of a superior grade to those prepared by other known processes but it also has a $TiO_2$ content at least comparable with, that of best grades of rutile in current commercial production.

Having broadly indicated the nature of the present invention and shown that the objects and advantages desired have been substantially achieved, more specific examples and embodiments of the invention will now be described by way of example and illustration.

Before describing the particular examples and embodiments, however, some attempt will be made to explain the remarkable difference between the natural titaniferous ore employed as a starting material and the synthetic titaniferous ore produced prior to leaching. To illustrate in an objective manner the benefits effectively associated with the synthetic ore, the following tests were conducted on a sample of ilmenite from the east coast of Australia and containing about 11.9% w./w. $Fe_2O_3$, 30.8% w./w. FeO, and 52.9% w./w. $TiO_2$.

(1) The natural untreated ilmenite was leached counter-currentwise in two stages by a 20% excess of a 32% solution of hydrochloric acid under a pressure of 35 p.s.i.g. at 110° C. in accordance with published instructions. The total treatment was conducted over a period of eight hours and the final dry product was found to contain 79% w./w. $TiO_2$, the $TiO_2$ losses in the effluent being about 0.5% of the $TiO_2$ originally present.

(2) The natural untreated ilmenite was treated in a single stage with a 20% excess of a 20% hydrochloric acid solution at 110° C. for four hours under reflux conditions. The dry product contained 72.9% w./w. $TiO_2$ with an effluent loss corresponding to 0.5% of the $TiO_2$ originally present.

(3) The natural untreated ilmenite was treated with hydrogen at 875° C. until the ferric values present originally had been reduced to the ferrous state. This material was then leached at 110° for four hours with a 20% excess of 20% hydrochloric acid under reflux conditions. The dry product contained 76% w./w. $TiO_2$ with an effluent loss corresponding to 0.6% of the $TiO_2$ originally present.

(4) The natural ilmenite was oxidized by air for two hours at 875° C. before being leached with 20% hydrochloric acid as described in (2) above. The product contained 55.2% w./w. $TiO_2$ with an effluent loss corresponding to 5.6% of $TiO_2$ originally present.

(5) After oxidizing in air as described in (4) above, the material was treated with hydrogen at 875° C. for five minutes in order to produce synthetic ilmenite. After acid leaching for 3 hours but otherwise as in (2) above, a pale-yellow product was obtained which contained 97.1% w./w. $TiO_2$ with an effluent loss corresponding to about 1.2% of the $TiO_2$ originally present.

It will be noted that the $TiO_2$ content of the material made by the process of this invention (para. 5 above) not only is of a far superior grade than those prepared by the methods described in paras. 1 to 4 above, but also has a significantly higher $TiO_2$ content than that of most grades of rutile in current commercial production. Clearly, therefore, the synthetic ilmenite must differ significantly from the natural ilmenite.

Whilst it is difficult to specify the precise nature of the changes occurring during the formation of the synthetic ilmenite, it is thought that, during the deoxidation stage when the ilmenite structure is being formed, the development of this structure is extremely rapid in comparison with that which probably occurred during the formation of the natural ilmenite. As a result, a material is produced which possesses many structural defects and lattice strains which, it is considered, are largely responsible for the enhanced chemical reactivity.

We therefore prefer to carry out the oxidation stage at relatively low temperatures (e.g. about 900° C.) both for economy reasons and in order to facilitate the formation of hematite ($Fe_2O_3$) and rutile ($TiO_2$) as separate phases with a minimum amount of pseudo-brookite ($Fe_2O_3 \cdot TiO_2$).

A modification of the process of this invention renders it particularly useful for the treatment of titaniferous ores containing appreciable quantities of associated chromium minerals and other minerals having magnetic properties.

In both the conventional sulphuric acid leaching process and the more recent chlorination process, the presence of appreciable quantities of chromium mineral in association with the titaniferous ores is undesirable. In the sulphuric process the unselective nature of the acid digestion stage takes chromium values into solution along with titanium and iron values. Chromium values in solution are of great concern since not only are they difficult to separate from the subsequently precipitated titanium species, but they also have a pronounced colouring effect on the final titanium dioxide product. In the chlorination process, substantially all of the chromium values, together with iron and impurity metals present in the ore may be separated readily from the titanium values after chlorination. Chromium minerals therefore do not result in significant contamination of the final titanium dioxide product in this case but the presence of significant amounts of iron and chromium species in the charge increases the consumption of chlorine per unit weight of titanium dioxide produced and this imposes an economic penalty on the chlorination process.

To achieve a reduction in chromium concentration, consistent with the use of one or other of these processes, it has been necessary in the past to subject the ore to an initial magnetic separation step to thereby produce a titanium-rich and chromium-rich fraction. However this has provided only a partial solution since the similarity in the magnetic susceptibilities of ilmenite and chromite (which is the main chromium-containing impurity usually associated with titaniferous ores) prevents a clean separation of those minerals. Thus, if titaniferous ores containing associated chromite are to be exploited effectively for their titanium values, significant losses of ilmenite will be incurred when lowering the chromium content to an acceptable level by magnetic methods.

We have found that if an ilmenite ore containing associated chromite is subjected to the oxidation and reduction stages of the process described above, the chemical activity of the iron oxide component of the ilmenite is enhanced, as has been described, but that of the iron oxide component of the chromite, is not materially changed.

This result thus offers a material advantage for the up-grading of ilmenite ores having associated chromite and which, as a consequence, have been of little economic value. For, after the above treatment, the ore may be subjected to a suitable leaching operation, as described above to remove the activated iron values of the ilmenite, and thereby leave a product comprising essentially of titanium dioxide and substantially unaltered chromite. This product is readily amenable to further up-grading since, although untreated ilmenite is strongly magnetic, the upgrade, or "synthetic rutile," derived from this mineral is not. Thus it is now possible to use a magnetic separation step to separate the unchanged magnetic chromite from the leached product.

The present invention thus provides a process for upgrading titaniferous ores containing associated chromium-containing minerals, wherein the said ore is subjected in turn to oxidizing conditions sufficient to convert substantially all of the iron component of the titaniferous minerals to the ferric state, without significant oxidation of the iron component of the chromium-containing mineral; and then to deoxidizing conditions sufficient to convert substantially all of said iron from the ferric state to the ferrous state, without the formation of significant amounts of metallic iron, and without change to the iron component of the chromium-containing mineral; whereafter the ore is leached to remove substantially all of the iron values of the titaniferous minerals, and then subjected to a magnetic separation treatment to remove substantially all of the chromium-containing mineral, thereby leaving an up-grade, rich in titanium dioxide and substantially free of chromium values.

While natural chromite will be the form in which chromium minerals will normally be encountered in association with titaniferous ores, ratios of chromic oxide to iron outside the normally accepted range for chromite are to be understood as being included within that term in the following description.

It will also be appreciated that while the present invention provides a means for obtaining an up-grade rich in titanium dioxide but low in chromium, it also provides a further advantage over the prior art practice in yielding a means for obtaining a clean chromite fraction, substantially free of titaniferous values. This clean high-chromite fraction may therefore be further processed by known means for the recovery of chromium compounds or metallic chromium, without the need for an extensive and costly purification step to remove titaniferous values. Thus, in a further aspect of the present invention, there is provided a process for up-grading titaniferous ores containing associated chromite, whereby the ore is treated as described above to thereby provide both a titanium-rich up-grade, substantially free of chromium values, and a chromium-rich up-grade substantially free of titanium values.

To further portray the nature of the present invention, the chosen embodiment illustrated in the accompanying drawings will now be described. In the drawings.

Figure 1:
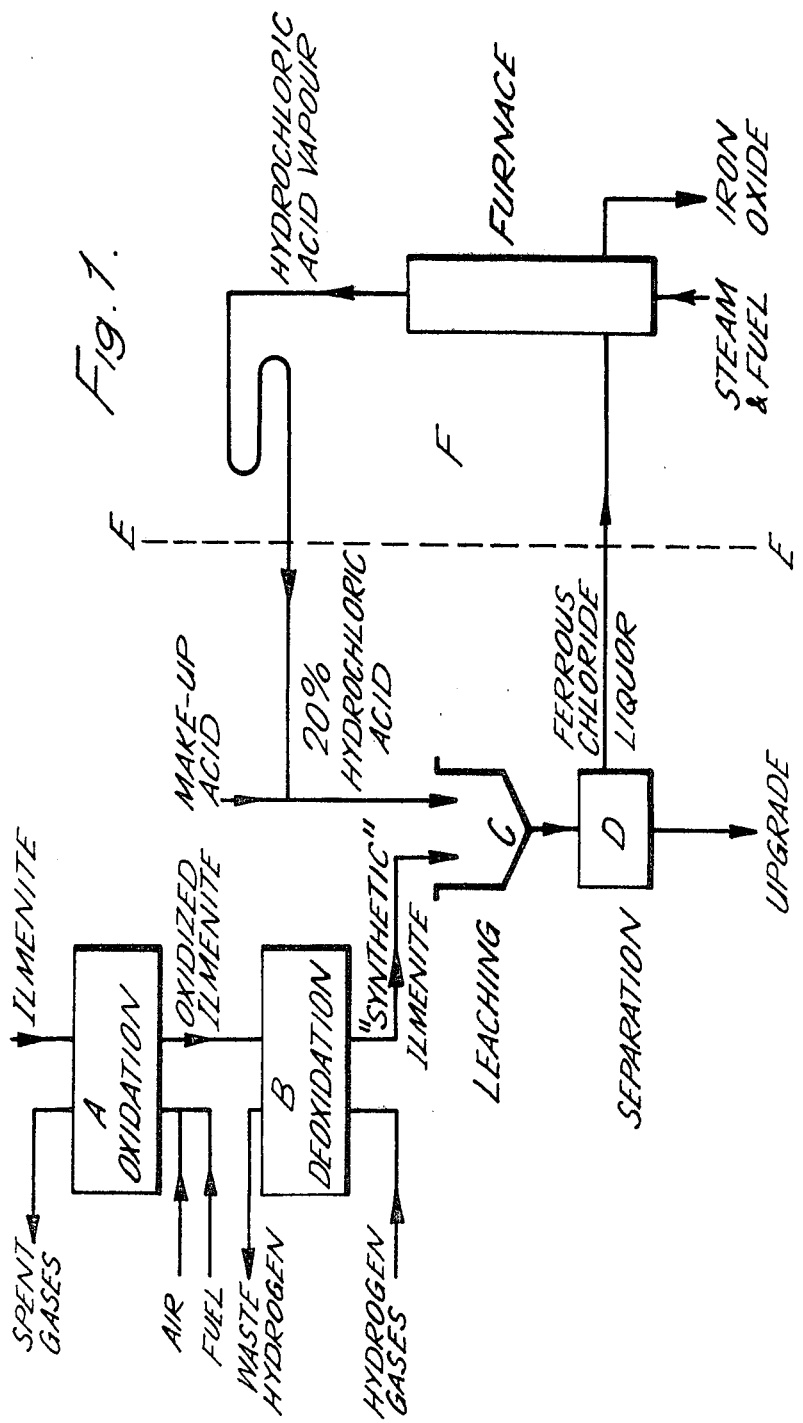
FIG. 1 is a flow sheet of a typical process according to the invention.

Referring firstly to FIG. 1, natural ilmenite enters an oxidation stage A where it is oxidized by air in a suitably heated reactor. Both this stage and the following deoxidation stage may be conveniently carried out in a single reactor although for convenience of description two separate stages are shown. The reactors may be of any suitable known type and may be of the stationary or fluid bed type or alternatively may be of the counter-current type in which the solid and gaseous reactants each move in opposite directions through the reactor.

After oxidation at A the oxidized material is subjected to a deoxidation stage B in which the material is treated with hydrogen or hydrogen containing gases. This results in the formation of synthetic ilmenite as hereinbefore described.

The synthetic ilmenite passes to a leaching stage C where it is leached, in conventional apparatus with 20% aqueous hydrochloric acid which dissolves out the ferrous iron and other acid-soluble non-titaniferous impurities, leaving an up-grade which is rich in titanium dioxide. The liquid and solid phases are separated in stage D which consists of any suitable known apparatus such as a batch or continuous filter, decanter, centrifuge or any suitable combinations thereof. The solid up-grade product is then washed and dried and calcined.

The aqueous ferrous chloride liquor then passes to a conventional hydrochloric acid recovery process F which is here shown separated from the rest of the process by the dotted line E—E. The recovery process illustrated is the "Aman" process in which the ferrous chloride liquor is oxidized and hydrolysed with steam to form hydrochloric acid vapour and ferric oxide. The acid is returned to the leaching stage C as a 20% solution, make-up acid being added if necessary.

The invention is further illustrated by the following examples:

EXAMPLE 1

150 gm. of ilmenite from east coast of Australia (Gladstone) having the following typical analysis:

| | Percent |
|---|---|
| $TiO_2$ | 52.9 |
| $Fe_2O_3$ | 11.9 |
| $FeO$ | 30.8 |
| $Cr_2O_3$ | 0.15 |
| $MnO$ | 1.77 |
| $MgO$ | 0.46 |
| $Al_2O_3$ | 0.23 |
| $CaO$ | 0.05 | was oxidized in a 4.5 cm. diameter fluid bed reactor using air as the fluidizing gas for two hours at 870° C. The oxidized ore was then deoxidized by passing hydrogen through the fluid bed for five minutes at 870° C. The material was cooled to room temperature in a non-oxidizing atmosphere.

70 gm. of the deoxidized material was then leached with 200 gm. of 20% hydrochloric acid solution under refluxing conditions for three hours. The temperature of leaching was maintained at 108–110° C. and agitation was provided by shaking the flask. At the end of leaching time, the contents were allowed to cool, filtered, washed with water and the residue dried and then ignited at 800–850° C. The ignited product analysed as follows:

| | Percent |
|---|---|
| $TiO_2$ | 97.1 |
| $Fe_2O_3$ | 1.08 |
| $Cr_2O_3$ | 0.14 |
| $MgO$ | 0.08 |
| $MnO$ | 0.05 |
| $Al_2O_3$ | 0.3 |
| $CaO$ | 0.03 |

EXAMPLE 2

Ilmenite from Quilon (India) containing 60.3% $TiO_2$ 9.7% $FeO$ and 24.8% $Fe_2O_3$ was oxidized, deoxidized and leached as in Example 1. The leached product on drying and ignition analysed as follows:

| | Percent |
|---|---|
| $TiO_2$ | 95.8 |
| $Fe_2O_3$ | 0.7 |

EXAMPLE 3

Mined and dressed titaniferous material from Tahawas (U.S.A.) containing 44.4% $TiO_2$, 36.7% $FeO$ and 4.4% $Fe_2O_3$ was ground to −30 mesh and then treated as in Example 1 and 2 above except that the leaching time was increased from three to four hours. The upgraded material analysed as follows:

| | Percent |
|---|---|
| $TiO_2$ | 83.7 |
| $Fe_2O_3$ | 1.5 |
| $SiO_2$ | 5.0 |
| $CaO$ | 1.0 |
| $MgO$ | 0.8 |
| $Al_2O_3$ | 3.6 |

The analysis showed that the iron removal in this case was as good as in Examples 1 and 2, but that the $TiO_2$ content of the product was much lower due to the presence of large percentage of insoluble gangue material.

EXAMPLE 4

Ilmenite from west coast of Australia having 55.2% $TiO_2$, 23.4% $FeO$ and 17.8% $Fe_2O_3$ was treated as in Example 1. The upgraded material had the following analysis.

| | Percent |
|---|---|
| $TiO_2$ | 96.6 |
| $Fe_2O_3$ | 1.0 |

Figure 2:
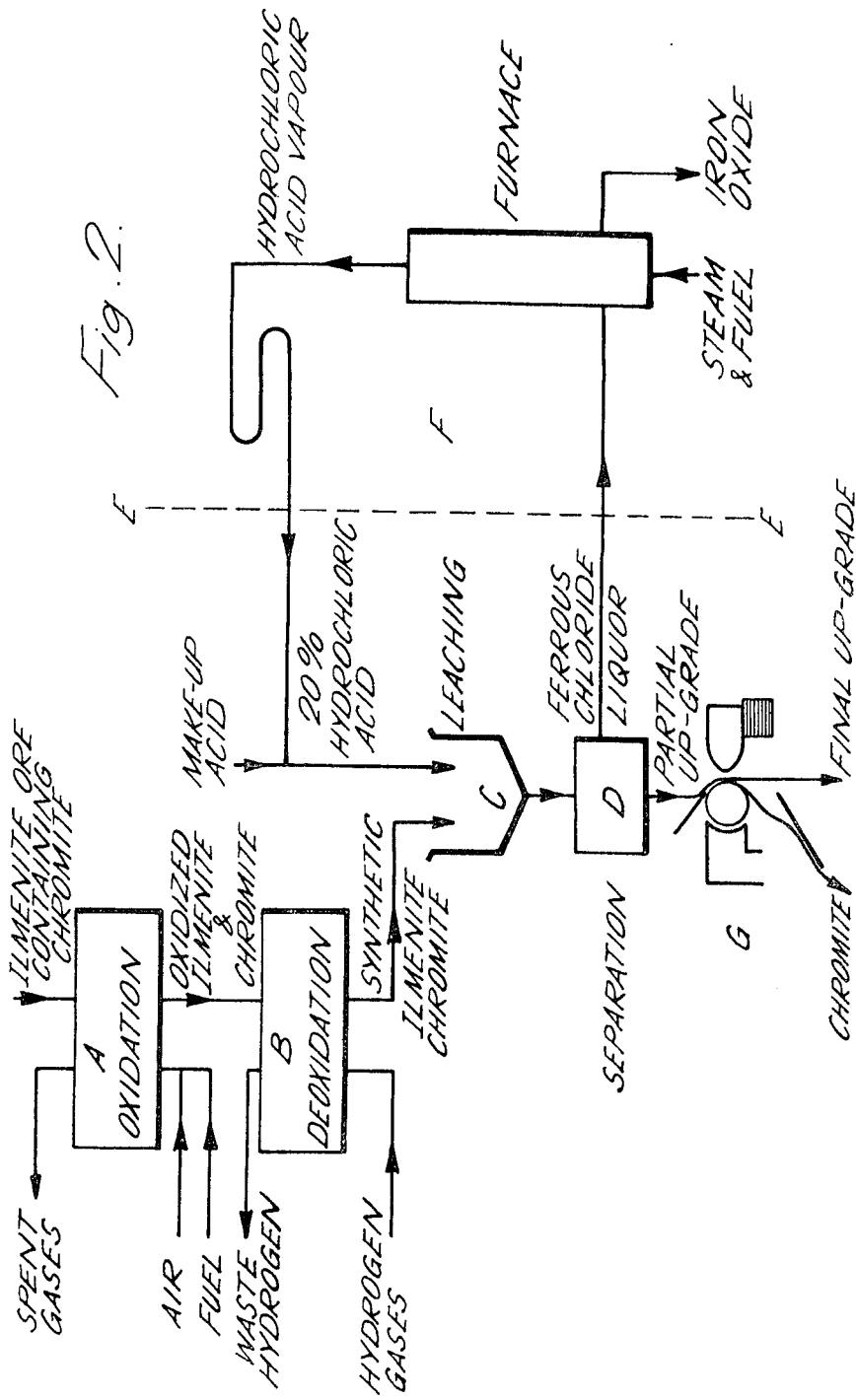
FIG. 2 is a flow sheet of a modified form of the process for chromite-containing ilmenites.

The process shown diagrammatically in FIG. 2 is essentially the same as that of FIG. 1. A natural ilmenite having associated chromite enters the oxidation stage A where the iron component of the ilmenite is oxidized by air in a suitably heated reactor.

After oxidation at A the oxidized material is subjected to the deoxidation stage B in which the material is treated with hydrogen or hydrogen containing gases. This results in the formation of a "synthetic" ilmenite, as described above.

The deoxidized material (which is now essentially a mixture of synthetic ilmenite and chromite) passes to the leaching stage C where it is leached with 20% aqueous hydrochloric acid. This dissolves out the ferrous iron of the synthetic ilmenite, as well as other acid-soluble non-titaniferous impurities, but not the ferrous iron of the chromite, thereby leaving a titanium dioxide rich residue containing chromite. The liquid and solid phases are separated as before in liquid separator D, the aqueous ferrous chloride liquor then passing to the hydrochloric acid recovery process F.

The solid product from D is washed and dried and pased to magnetic separator G, which consists of any suitable known apparatus, to effect a clean separation of the product into a non-magnetic titanium dioxide rich fraction and a magnetic chromite fraction. The up-grade may then be treated to recover titanium values by known methods, whilst the chromite may be used for the recovery of chromium values.

This modification of the invention is further illustrated by the following examples.

EXAMPLE 5

Samples of six ilmenite ores having associated chromite were subjected to the process of the present invention. 150 gm. samples were oxidized in a 4.5 cm. diameter fluid bed reactor using air as the fluidizing gas for two hours at 870° C. The oxidized ore was then deoxidized by passing hydrogen through the fluid bed for five minutes at 870° C. The material was cooled to room temperature in a non-oxidizing atmosphere and then leached in 400 gm. of 20% hydrochloric acid under reflux conditions for three hours. The temperature of leaching was maintained at 108–110° C. and agitation was provided by shaking the flask. At the end of the leaching time, the mixture was cooled, filtered, washed with water and the residue dried thoroughly. The residue was then passed through a magnetic separator to produce non-magnetic up-grade rich in titanium dioxide and a magnetic fraction rich in chromite. Analysis of the products at each stage are as presented in Table 1.

EXAMPLE 6

A single sample of ilmenite (Ore II in Table I) was pased through a high intensity induced roll separator using progressively increased magnetic fields. The mass fractions of the products of the different stages together with their analyses are given in Table II.

TABLE II

| Current (amps) | Mass fraction (percent) | Analysis of product (wt. percent) | | | $Cr_2O_3/TiO_2$ |
|---|---|---|---|---|---|
| | | $TiO_2$ | Fe | $Cr_2O_3$ | |
| 0.2 | 26.7 | 50.9 | 34.9 | 0.2 | 0.0039 |
| 0.4 | 61.3 | 51.8 | 33.0 | 1.07 | 0.02 |
| 1.0 | 12.0 | 50.7 | 25.2 | 5.59 | 0.1 |

These results show that in order to obtain ilmenite containing less than 0.2% $Cr_2O_3$ by magnetic separation methods, approximately 73% of the ilmenite has to be rejected. On the other hand, by the method of the present invention the production of an upgrade containing more than 95% $TiO_2$ and about 0.1% $Cr_2O_3$ is achieved with the loss of as liittle as about 1% of the $TiO_2$ values.

It will be appreciated that further modifications may be made to the procedure just described. For example, it will be apparent, and it has been demonstrated, that the basis for upgrading by magnetic methods may be applicable to ilmenites containing other ion-containing impurities, e.g. silicates, whose stability is such that their iron content is sensibly unchanged during the oxidation, deoxidation and leaching operations of the upgrading process.

As indicated above, it will be appreciated by those skilled in the art that such examples are not limited or exhaustive and that many other variations of operation can be devised without departing from the spirit or scope of the present invention. The present invention also provides the above-described synthetic titaniferous ores as new compositions of matter.

What is claimed is:

1. In a process for the beneficiation of titaniferous ores, to produce an up-grade material rich in titanium dioxide, the steps of oxidizing the natural ore to convert substantially all of the iron values associated with titanium in the ore to the ferric state; and reducing the oxidized ore with a reducing reagent at a temperature sufficient to convert substantially all of the iron values in the ore to the ferrous state thereby forming a product which displays the X-ray powder diffraction pattern of ilmenite and which includes not more than about 20% w./w. of metallic iron.

2. A process as claimed in claim 1, wherein the oxidation is carried out at a temperature below that at which sintering of the ore occurs.

3. A process as claimed in claim 1, wherein the oxidation step comprises contacting the ore with an oxidant selected from the group comprising gaseous oxygen, mixtures of oxygen with at least one other relatively inert gas, and compounds containing oxygen and which are capable of oxidizing iron to the ferric state under the reaction conditions.

4. A process as claimed in claim 3, wherein the oxidant is atmospheric air.

5. A process as claimed in claim 1, wherein the deoxidation step comprises contacting the oxidized ore with a reductant selected from the group comprising hydrogen,

TABLE I

| Ilmenite | Composition of raw material (wt. percent) | | | | Composition after oxidation deoxidation and leaching (wt. percent) | | | | Composition after oxidation, deoxidation, leaching and magnetic separation (wt. percent) | | | | | | | |
|---|---|---|---|---|---|---|---|---|---|---|---|---|---|---|---|---|
| | | | | | | | | | Titaniferous fraction | | | | Chromite fraction | | | |
| | $TiO_2$ | Fe | $Cr_2O_3$ | $Cr_2O_3/TiO_2$ | $TiO_2$ | Fe | $Cr_2O_3$ | $Cr_2O_3/TiO_2$ | $TiO_2$ | Fe | $Cr_2O_3$ | $Cr_2O_3/TiO_2$ | $Cr_2O_3$ | Fe | $TiO_3$ | $TiO_2$ loss |
| Ore I | 49.5 | 28.03 | 4.81 | 0.097 | 72.5 | 4.01 | 7.27 | 0.1 | 95.15 | 0.8 | 0.17 | 0.0017 | 30.74 | 16.45 | 5.57 | 1.8 |
| Ore II | 51.1 | 32.5 | 1.27 | 0.024 | 91.97 | 1.18 | 2.29 | 0.024 | 97.02 | 0.3 | 0.08 | 0.0008 | 31.45 | 13.93 | 7.32 | 0.5 |
| Ore III | 51.84 | 32.2 | 1.19 | 0.022 | 91.94 | 1.22 | 2.1 | 0.022 | 96.78 | 0.41 | 0.06 | 0.0006 | N.D. | N.D. | N.D. | |
| Ore IV | 51.7 | 32.5 | 1.01 | 0.019 | 92.6 | 1.14 | 1.86 | 0.02 | 96.58 | 0.44 | 0.09 | 0.0009 | N.D. | N.D. | N.D. | |
| Ore V | 50.19 | 32.8 | 0.88 | 0.017 | 91.82 | 0.91 | 1.7 | 0.018 | 97.52 | 0.39 | 0.17 | 0.0017 | N.D. | N.D. | N.D. | |
| Ore VI | 47.36 | 28.5 | 5.65 | 0.119 | 71.69 | 5.94 | 8.35 | 0.116 | 97.7 | 0.4 | 0.05 | 0.0005 | 31.63 | 15.11 | 3.23 | 1.4 |

Note.—N.D.=Not determined.

carbon monoxide, hydrocarbon gases, and mixtures containing any two or more of these gases.

6. A process as claimed in claim 5, wherein the reductant is hydrogen.

7. A process as claimed in claim 5, wherein the deoxidation step is carried out at a temperature between 850° and 900° C.

8. A process for producing an up-grade material rich in titanium dioxide from a titaniferous ore which comprises the steps of oxidizing the natural ore to convert substantially all of the iron values associated with titanium in the ore to the ferric state; reducing the oxidized ore with a reducing reagent at a temperature sufficient to convert substantially all of the iron values in the ore to the ferrous state thereby forming a product which displays the X-ray powder diffraction pattern of ilmenite and which includes not more than about 20% w./w. of metallic iron; deoxidizing the oxidized ore to convert said iron values to the ferrous state thereby to form a product which displays the X-ray powder diffraction pattern of ilmenite; and leaching said product to remove substantially all of the iron values therefrom.

9. A process as claimed in claim 8, wherein the ore is leached with acid.

10. A process as claimed in claim 9, wherein the acid is hydrochloric acid.

11. A process as claimed in claim 8, wherein the treated ore is leached with hydrochloric acid of about 20% w./w. concentration at a temperature between about 105° and 110° C.

12. A process as claimed in claim 8, wherein the oxidation step comprises contacting the ore with atmospheric air.

13. A process as claimed in claim 8, wherein the deoxidation step comprises contacting the oxidized ore with hydrogen at a temperature between 850° and 900° C.

14. A process as claimed in claim 8, wherein the ore contains substantial amounts of a chromium-containing mineral, and wherein after leaching the ore is subjected to a magnetic separation treatment, to remove substantially all of the chromium-containing mineral from the ore.

15. A process for producing an up-grade material rich in titanium dioxide from a titaniferous ore, which process comprises the steps of:
contacting the natural ore with atmospheric air at a temperature of about 800° to about 900° C., thereby to oxidize substantially all of the iron values associated with titanium in the ore to the ferric state;
contacting the oxidized ore with hydrogen at a temperature of about 850° to 900° C. to convert substantially all of the iron values in the ore to the ferrous state thereby forming a product which displays the X-ray powder diffraction pattern of ilmenite and which includes not more than about 20% w./w. of metallic iron;
leaching the deoxidized ore with about 20% w./w. hydrochloric acid at a temperature of between about 105° and about 110° C., thereby to remove substantially all of the said iron values from the ore; and separating and washing the leached ore.

16. A process as claimed in claim 15, wherein the ore contains substantial amounts of magnetic materials and wherein after leaching the ore is subjected to a magnetic separation treatment, to remove substantially all of the magnetic materials from the ore.

17. A process as claimed in claim 15, wherein the ore contains substantial amounts of a chromium-containing mineral, and wherein after leaching the ore is subjected to a magnetic separation treatment, to remove substantially all of the chromium-containing mineral from the ore.

18. In a process for the beneficiation of a titaniferous ore to produce an up-grade material rich in titanium dioxide and containing not more than the equivalent of 1.5% by weight of $Fe_2O_3$ associated with the titanium dioxide, the steps of oxidizing the natural ore to convert substantially all of the iron values associated with titanium in the ore to the ferric state; reducing the oxidized ore with a reducing reagent at a temperature sufficient to convert substantially all of the iron values in the ore to the ferrous state thereby forming a product which displays the X-ray powder diffraction pattern of ilmenite and which includes not more than about 20% w./w. of metallic iron deoxidizing the oxidized ore to convert said iron values to the ferrous state, thereby to form a product which displays the X-ray powder diffraction pattern of ilmenite; and leaching the said product to remove substantially all of said iron values therefrom.

19. The process according to claim 18 wherein said leaching step is carried out with 20% w./w. hydrochloric acid at 105° to 110° C., at atmospheric pressure.

References Cited

UNITED STATES PATENTS

| | | | |
|---|---|---|---|
| 2,167,627 | 8/1939 | Alessandroni | 75—1 |
| 2,339,808 | 1/1944 | Ravnestad et al. | 75—1X |
| 3,105,755 | 10/1963 | Green | 75—1 |
| 3,252,787 | 5/1966 | Shiah | 75—1 |
| 3,257,198 | 6/1966 | Volk et al. | 75—1X |
| 3,338,704 | 8/1967 | Laurent et al. | 75—1 |
| 3,446,590 | 5/1969 | Michal et al. | 75—1X |
| 3,457,037 | 7/1969 | Aramendia et al. | 75—1X |
| 2,648,600 | 8/1953 | Reene | 75—1 |
| 2,745,730 | 5/1956 | De Vaney | 75—1 |

ALLEN B. CURTIS, Primary Examiner

U.S. Cl. X.R.

75—101

UNITED STATES PATENT OFFICE
CERTIFICATE OF CORRECTION

Patent No. 3,597,189          Dated August 3, 1971

Inventor(s) Hari Narayan Sinha and David McBride Waugh

It is certified that error appears in the above-identified patent and that said Letters Patent are hereby corrected as shown below:

Column 11, lines 18-20, delete "deoxidizing the oxidized ore to convert said iron values to the ferrous state thereby to form a product which displays the X-ray powder diffraction pattern of ilmenite". Column 12, lines 28-31, delete "deoxidizing the oxidized ore to convert said iron values to the ferrous state thereby to form a product which displays the X-ray powder diffraction pattern of ilmenite".

Signed and sealed this 18th day of April 1972.

(SEAL)
Attest:

EDWARD M. FLETCHER, JR.       ROBERT GOTTSCHALK
Attesting Officer               Commissioner of Patents